(12) United States Patent
Wang et al.

(10) Patent No.: US 7,970,841 B2
(45) Date of Patent: Jun. 28, 2011

(54) CONVERTING DISPLAYABLE PORTIONS OF A TEXT MESSAGE INTO IMAGES

(75) Inventors: Zhao Yu Wang, Beijing (CN); Yuan Li, Beijing (CN); Miao Tao Feng, Beijing (CN); Shu Qing Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 12/416,290

(22) Filed: Apr. 1, 2009

(65) Prior Publication Data
US 2009/0300125 A1 Dec. 3, 2009

(30) Foreign Application Priority Data

May 29, 2008 (CN) .......................... 2008 1 0111010

(51) Int. Cl.
*G06F 15/16* (2006.01)
(52) U.S. Cl. ......... 709/206; 709/246; 455/466; 348/468
(58) Field of Classification Search .................. 709/246, 709/206; 455/466; 348/468
See application file for complete search history.

(56) References Cited

U.S. PATENT DOCUMENTS

| | | | |
|---|---|---|---|
| 5,802,314 A | 9/1998 | Tullis et al. | |
| 6,678,720 B1 | 1/2004 | Matsumoto et al. | |
| 2007/0178918 A1* | 8/2007 | Shon | 455/466 |
| 2008/0062314 A1* | 3/2008 | Yoo et al. | 348/468 |

* cited by examiner

*Primary Examiner* — Kyung-Hye Shin
(74) *Attorney, Agent, or Firm* — DeLizio Gilliam, PLLC

(57) ABSTRACT

The present subject matter discloses a method for transmitting a text message including: receiving a text message to be transmitted, which is encoded with a first character set encoding scheme; determining whether a final receiver of the text message supports the first character set encoding scheme; and in response to the situation in which the final receiver of the text message does not support the first character set encoding scheme: converting the text message to be transmitted into an image; and transmitting the converted image. With this method, parties involved in transmission of a text message can enable convenient and efficient transmission of the text message without requiring each party involved in the transmission of the text message to satisfy specific prerequisites normally necessary for proper reproduction of the text message transmitted from an opposite party. One of the specific prerequisites is that the parties involved in the real time communication should support a specific character set encoding scheme. The subject matter further provides a device for transmitting a text message capable of implementing the method for transmitting a text message, a device for processing a text message provided with the device for transmitting a text message, and a system for transmitting a text message through the device for processing a text message.

6 Claims, 9 Drawing Sheets

CONVERTING DISPLAYABLE PORTIONS OF A TEXT MESSAGE INTO IMAGES

CROSS-REFERENCE TO RELATED APPLICATIONS

The present application claims the benefit under 35 U.S.C. §119 of China; Application Serial Number 200810111010.7, filed May 29, 2008 entitled "Method, Device and System for Transmitting Text Message" which is incorporated herein by reference.

FIELD OF THE INVENTION

The present invention relates to the field of text transmission and in particular to a method, device and system for transmitting a text message.

BACKGROUND OF THE INVENTION

Along with advancement of computer communication technologies, people carry out remote message transmission increasingly by various communication tools in addition to their face-to-face communication. Instant Messengers (IM) such as MSN, ICQ, Google Talk, Yahoo Messenger, etc., are widely used online charting software at present. Communication tools such as NOTES, Outlook Express, etc., can also transmit a message in a manner of Email, etc. For transmission of a text message, a platform carrying these communication tools, e.g., a computer, stores numbers and characters by assigning one of the numbers to each of the characters. Prior to the birth of Unicode, there were hundreds of different encoding schemes for assigning the numbers to the characters, but no single encoding scheme can contain a sufficient number of characters. As well known, two prerequisites are present for an ability of the computer to reproduce the characters properly: 1) the computer shall be aware of how the characters are encoded, that is, it must be able to detect the encoding scheme and to decode the characters; and 2) the computer has a corresponding set of characters installed therein. Consequently, a risk of failing to reproducing a text message properly may arise in the event that the text message is transmitted between different encoding schemes and platforms supporting their respective distinct sets of characters.

Unicode can relieve this problem to some extent by assigning a unique number to each character. Unfortunately, if not all the platforms in communication support Unicode and install all sets of characters, or not all the messages transmitted between the communication platforms are encoded by the Unicode, a real-time communication receiver may still be unable to reproduce a received message properly due to the fact that not all the two prerequisites are met. A scenario may be imaged as follows.

A Chinese student A abroad in France is going to chat with his family B living in China, but no set of Chinese characters has been installed on his computer and can be installed at the public library. His family B has got no sufficient knowledge of English to express his or her idea clearly and has to type in Chinese words. However, a message transmitted from the computer of B is displayed on the computer of A as garbled characters. In this scenario, a message in French transmitted from A will also be displayed on the computer of B as garbled characters if no set of French characters is installed on the computer of B despite the ability of B to read French. How do A and B carry out smooth communication through an IM?

It is apparent that, the same problem of failing to reproduce a transmitted text message properly at a receiver may also arise if any party involved in transmission of a text message can not support a character set encoding scheme corresponding to the transmitted text message during the transmission of the text message, for example, in an Email, through use of a communication tool such as NOTES, Outlook Express, etc.

SUMMARY OF THE INVENTION

In view of the above problem present in the prior art, the invention proposes a method, device and system for transmitting a text message.

According to a first aspect of the invention, there is provided a method for transmitting a text message, comprising steps of: receiving a text message to be transmitted, which is encoded with a first character set encoding scheme; determining whether a final receiver of the text message supports the first character set encoding scheme; and in response to the situation in which the final receiver of the text message does not support the first character set encoding scheme: converting the text message to be transmitted into an image; and transmitting the image converted from the text message.

According to a second aspect of the invention, there is provided a device for transmitting a text message, comprising: a receiving unit configured to receive the text message to be transmitted, which is encoded with a first character set encoding scheme; a determining unit configured to determine whether a final receiver of the text message supports the first character set encoding scheme; and a text message processing unit configured to perform the following operations in response to a determination result obtained by the determining unit, the determination result indicating that the final receiver of the text message does not support the first character set encoding scheme: converting the text message to be transmitted into an image; and transmitting the image converted from the text message.

With the invention, parties involved in the transmission of a text message can enable convenient and efficient transmission of the text message without requiring each party involved in the transmission of the text message to satisfy specific prerequisites normally necessary for proper reproduction of the text message transmitted from an opposite party. One of the specific prerequisites is that the parties involved in the real time communication should support the character set encoding scheme corresponding to the text message to be transmitted.

BRIEF DESCRIPTION OF THE DRAWINGS

The above and other objects, features and advantages of the invention will become apparent from the descriptions of the embodiments thereof with reference to the drawings in which.

DETAILED DESCRIPTION OF THE INVENTION

Figure 1:
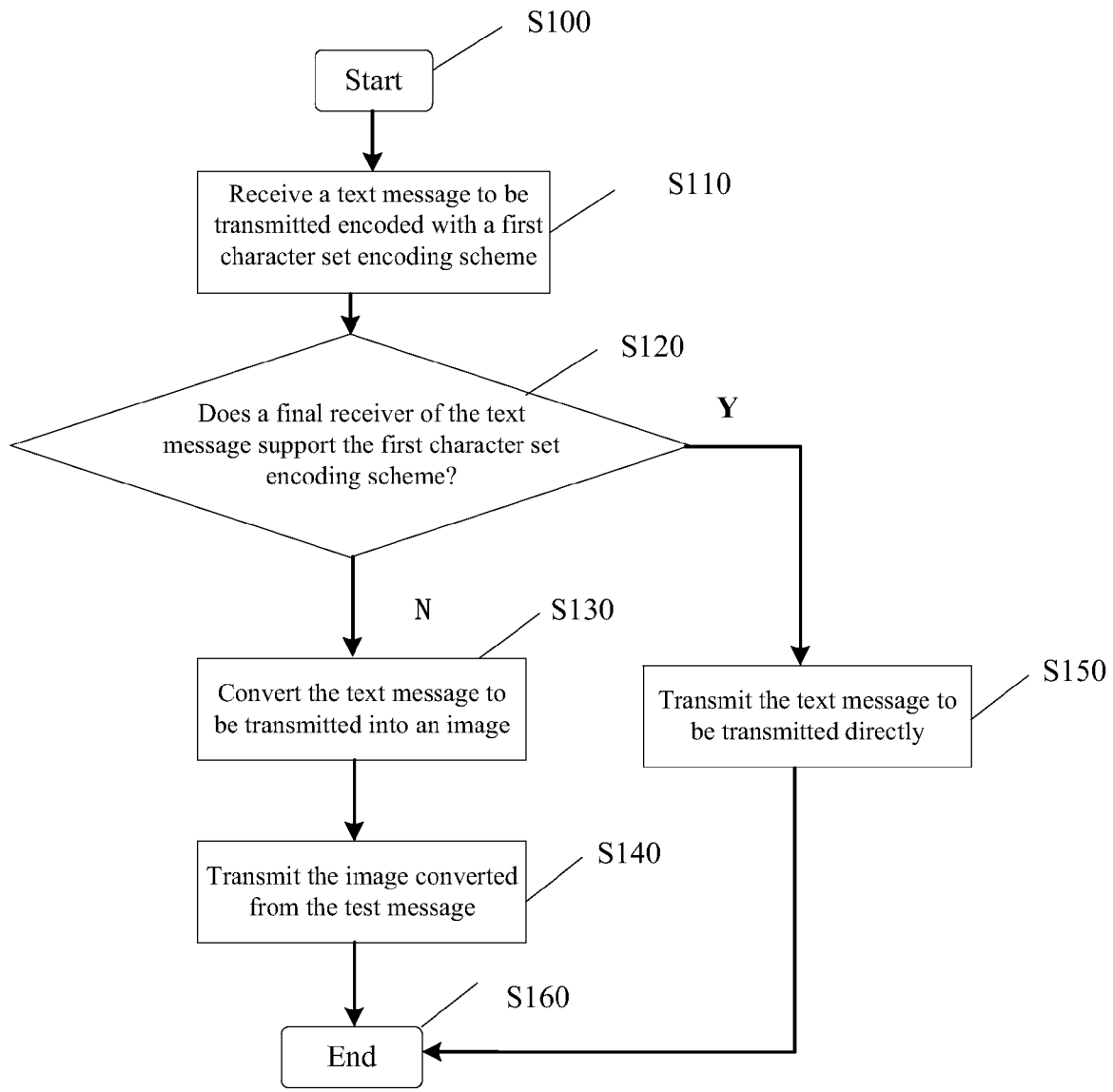
FIG. 1 is a simplified flow chart illustrating an embodiment of the method for transmitting a text message according to the invention.

FIG. 1 illustrates a simplified flow chart of an embodiment of the method for transmitting a text message according to the invention. As illustrated in FIG. 1, the method for transmitting a text message according to the embodiment includes the steps of: receiving a text message to be transmitted, which is encoded with a first character set encoding scheme (step S110); determining whether a final receiver of the text message support the first character set encoding scheme (step S120); converting the text message to be transmitted into an image if the final receiver of the text message does not support the first character set encoding scheme ("No" in the step S120) (step S130); and transmitting the image converted from the text message (step S140). In this embodiment, the text message to be transmitted is converted into an image if the final receiver of the text message does not support the first character set encoding scheme. However, those of ordinary skill in the art appreciate that the text message to be transmitted may not necessarily be converted into an image and also may be converted into voice, for example, provided that the text message is converted into a form that can be reproduced properly at the final receiver. Since almost all the existing communication tools and platforms can produce a message of image and voice properly, the method for transmitting a text message according to the present invention can enable proper and convenient transmission of a text message between parties involved in the transmission of the text message without requiring each party involved in the transmission of the text message to satisfy some specific prerequisites for reproduction of the text message. For example, one of the specific prerequisites is that the parties shall support a character set encoding scheme corresponding to the text message to be transmitted. Furthermore, conversion of the text message into an image can ensure that various original attributes of the text message to be transmitted, such as the font, color, etc., of the text message, are maintained completely in contents reproduced at the final receiver.

As illustrated in FIG. 1, the text message to be transmitted is transmitted directly if the final receiver of the text message supports the first character set encoding scheme ("Yes" in the step S120) (step S150). In this case, the process which can be implemented in various ways known in the art for transmitting the text is not essential to the present invention, and redundant descriptions thereof will be omitted here.

In an embodiment of the method for transmitting a text message according to the invention, the text message to be transmitted is received by selecting input contents of a specific input region in the process of the step S110 in the transmission method illustrated in FIG. 1. Conversion of the text message to be transmitted in the specific input region into an image will be described below.

Figure 2A:
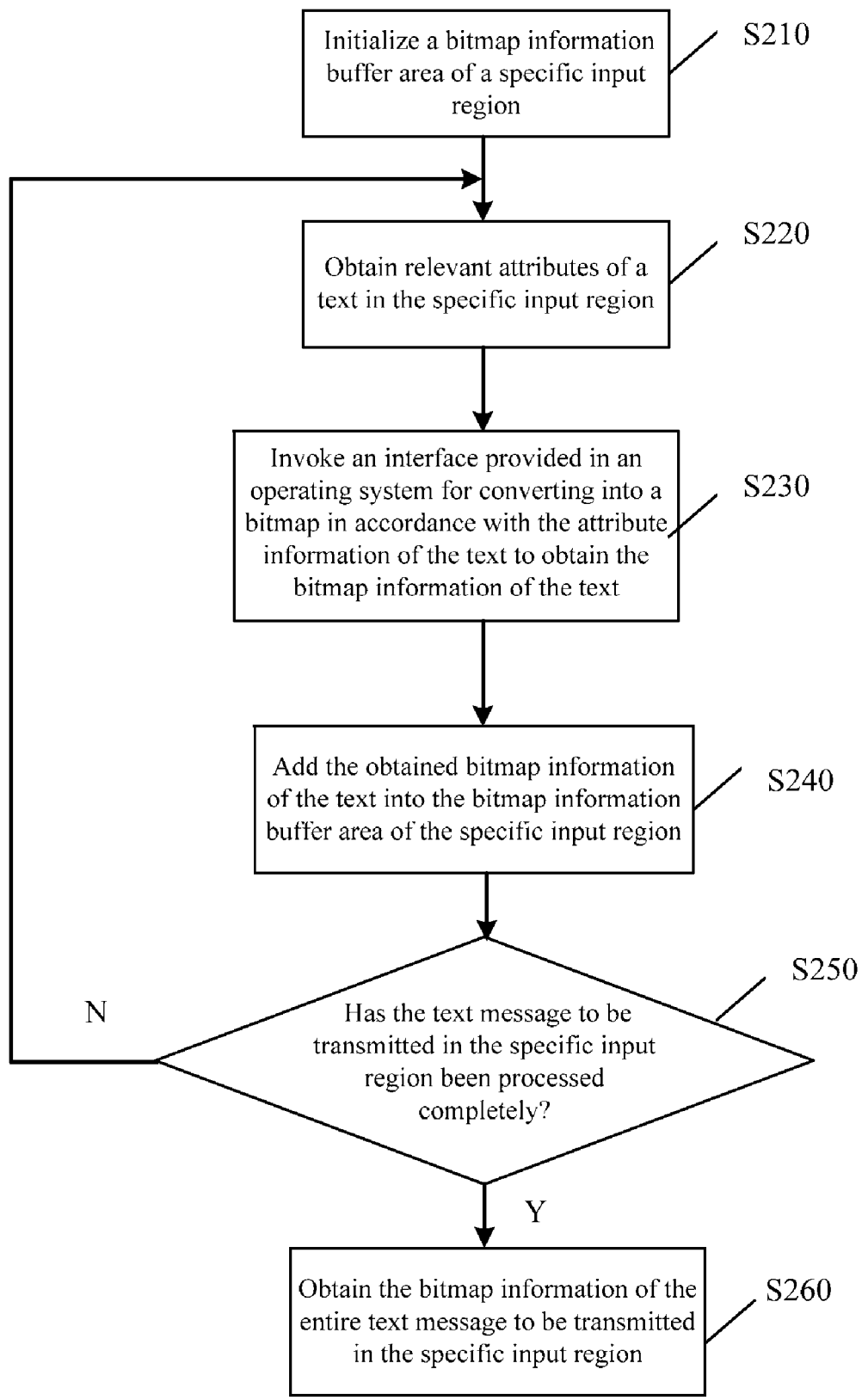
FIG. 2A is a simplified flow chart illustrating a simplified flow chart of a process for converting a text message to be transmitted into an image in an embodiment of the method for transmitting a text message according to the invention.

FIG. 2A is a simplified flow chart illustrating a process of converting a text message to be transmitted in a specific input region into an image in an embodiment of the method for transmitting a text message according to the invention. As illustrated in FIG. 2A, a bitmap information buffer area of the specific input region is initialized (step S210). The buffer area is another storage space inside a sender of the text message to be transmitted. This buffer area is different from a display memory storage space of the sender, for example. Then, the following operations are preformed on a text in the specific input region: obtaining relevant attributes of the text, such as the color, the font, etc., of the text (step S220); invoking an interface provided in an operating system of the sender for converting into a bitmap in accordance with the attribute information of the text to obtain the bitmap information of the text (step S230); adding the obtained bitmap information of the text into the bitmap information buffer area of the specific input region (step S240); and determining whether the text message to be transmitted in the specific input region has been processed completely (step S250). If not ("No" in the step S260), then processing in the steps S220 to S240 are repeated on another text in the specific input region until the bitmap information of the entire text message to be transmitted in the specific input region is obtained (step S260). Thus, the text message to be transmitted can be converted into an image in accordance with the obtained bitmap information in the bitmap information buffer area. This method is particularly effective when the screen of a display can not contain all the contents which are input at a time. Of course, various other appropriate methods for conversion of a text message into an image can also occur to those of ordinary skill in the art, and descriptions thereof will be omitted here. It shall be noted that the text message in the specific input region is processed per unit of a text in the steps S220 to S240, but this unit of processing can vary readily by setting a corresponding parameter.

Figure 2B:
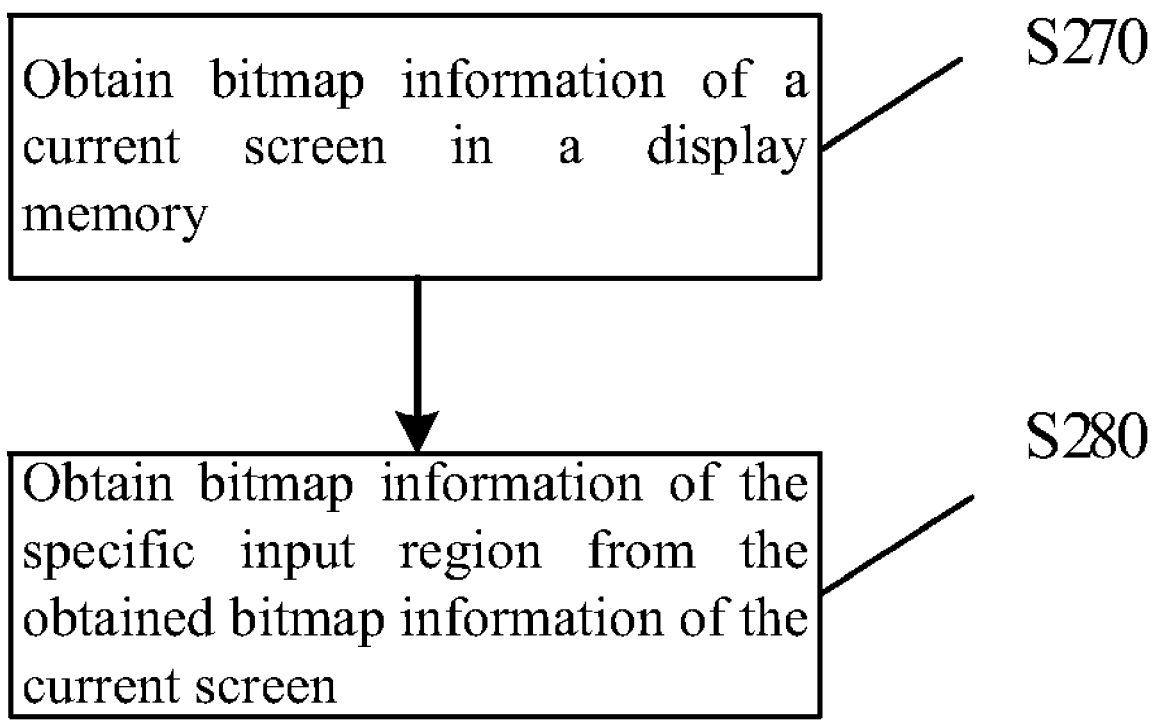
FIG. 2B is a simplified flow chart illustrating a simplified flow chart of a process for converting a text message to be transmitted into an image when contents in a specific input region are all visible in an embodiment of the method for transmitting a text message according to the invention.

A situation may also be present in practice in which contents in a specific input region, for example, a region in the screen of the sender for inputting a text message to be transmitted, are all visible, which means that it is not necessary to execute an operation such as scroll to view the entire text message to be transmitted. At this time, all the bitmap information of the text message to be transmitted in the specific input region has been stored in a display memory. In such a case, the text message to be transmitted can be converted into an image by utilizing the bitmap information stored in the display memory of the sender of the text message. FIG. 2B is a simplified flow chart illustrating a process for converting a text message to be transmitted into an image when the contents in the specific input region are all visible in an embodiment of the method for transmitting a text message according to the invention. As illustrated in FIG. 2B, bitmap information of the current screen in the display memory is obtained (step S270); and bitmap information of the specific input region is obtained from the bitmap information of the current screen obtained in the step S270 (step S280). Thus, the text message to be transmitted can be converted into an image in accordance with the bitmap information in the display memory of the sender. Of course, those of ordinary skill in the art can readily appreciate that a text message to be transmitted can also be converted into an image as in the processing method as illustrated in FIG. 2A even in such a case that contents in the specific input region are all visible. That is, the bitmap information of the text message to be transmitted can be obtained with use of a bitmap information buffer area corresponding to the specific input region instead of the display memory storage space of the sender for further conversion of the text message to be transmitted into an image.

The processes for converting a text into an image as illustrated in FIG. 2A and FIG. 2B can be performed at the sender in a manner such as program invoking, etc., and a button of "Text-to-image conversion" can be arranged on the interface of the sender to trigger execution of the conversion processes, for example.

As described above, FIG. 2A and FIG. 2B illustrate a situation where the specific input region includes the entire text message currently received by the sender. In practice, it is sometimes necessary to convert only a part of the text message received by the sender. For example, when a character set encoding scheme for one part of the text message received by the sender is supported by the final receiver and a character set encoding scheme for the other part is not supported by the final receiver, a specific input region can be self-defined for implementing the partial conversion. The sender can self-define a specific input region as necessary by defining a start and an end of the specific input region respectively, and all the contents in the self-defined specific input region are required to undergo the text-to-image conversion. For example, the processing method as illustrated in FIGS. 2A and 2B may be used to perform the text-to-image conversion on all the contents in the self-defined specific input region. Furthermore, a button of "Partial conversion", for example, can be arranged on the interface of the sender to enable execution of this partial conversion function. That is, a start of the self-defined specific input region is defined when the button is initially pressed, and an end of the self-defined specific input region is defined when the button is pressed again. In a specific embodiment, both the button of "Partial conversion" and the button of "Text-to-image conversion" or only the button of "Partial conversion" may be arranged on the interface of the sender. In the latter case, the self-defined specific input region can be arranged to include all the contents currently received by the sender.

Furthermore, the sender can also select a desired text message from another application, such as a notepad file of ".txt", a ".doc" file, etc., perform the conversion on the selected text message, and include an image converted from the text message in the text message to be transmitted. For example, a snapshot function in Sametime 7.5.1, which is an instant messenger available from IBM Corp., can implement such a process. Alternatively, a text message received from another application can be taken as a part of or the whole of the text message to be transmitted, and then the text message transmission processes as illustrated in FIG. 1, FIG. 2A and FIG. 2B and FIG. 3A to FIG. 3D can be performed on the determined text message to be transmitted.

In the method for transmitting a text message according to the present invention as illustrated in FIG. 1, the process of determining whether the final receiver of the text message supports the first character set encoding scheme in the step S120 can be performed in at least two possible implementing modes. In one implementing mode, the sender can start a text-to-image conversion process according to a response message returned from the receiver, and the response message indicates that the receiver does not support the character set encoding scheme for the text message to be transmitted. This response message may be a text which can be displayed properly at the sender, for example, the text of "Please convert your transmitted contents into an image", or any other response message enabling the sender to know that the receiver does not support the character set encoding scheme for the text message to be transmitted. In the other implementing mode, the sender can automatically detect the situation as to whether the receiver supports the character set encoding scheme for the text message to be transmitted prior to transmission of the text message to be transmitted and hereby decide whether or not to start a text-to-image conversion process. FIG. 3A to FIG. 3D illustrate simplified flow charts of specific examples of such an automatic detection process, respectively.

Figure 3A:
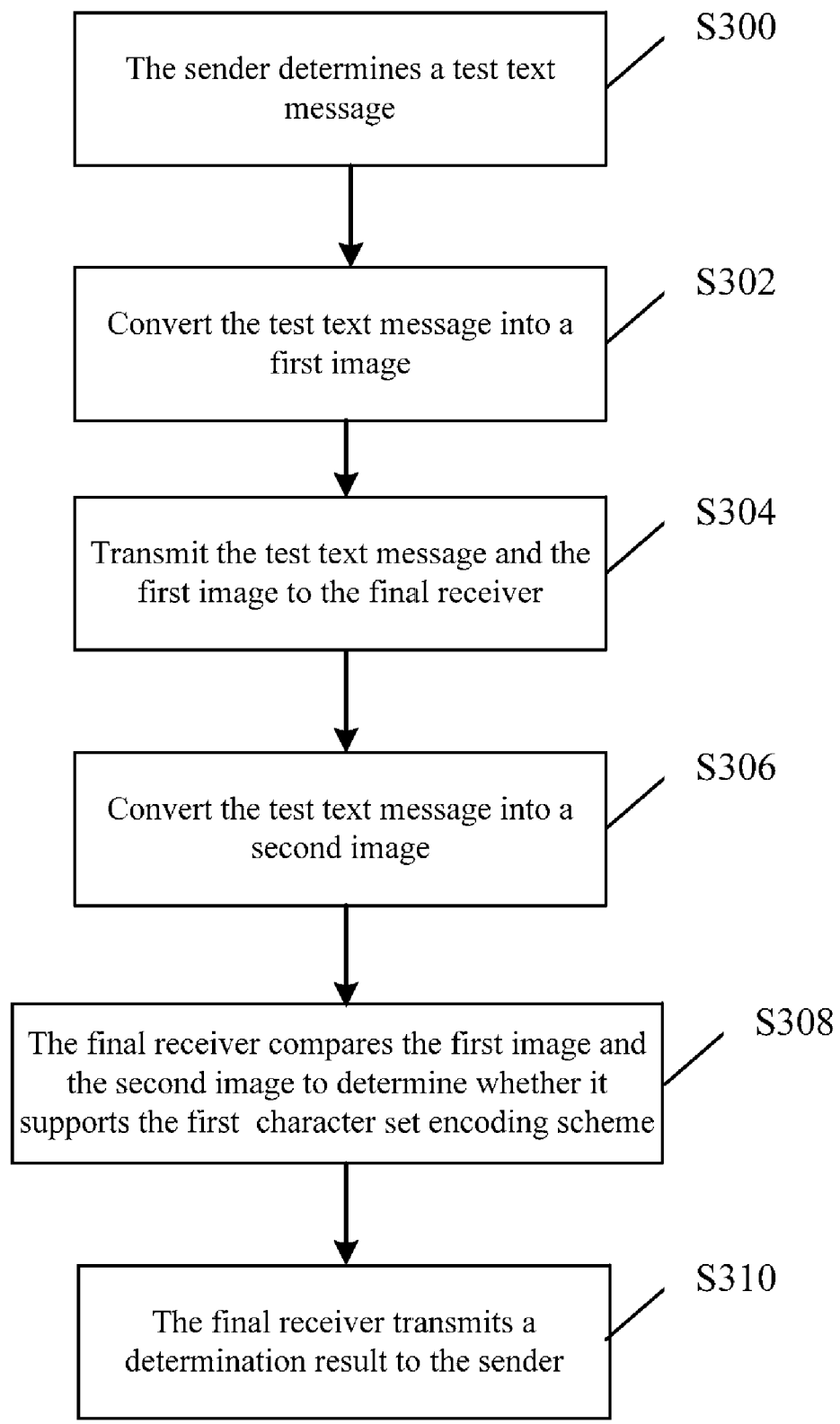
FIG. 3A to 3D are simplified flow charts illustrating respectively several specific examples of a process for determining whether a final receiver of the text message supports the first character set encoding scheme in the method as illustrated in FIG. 1.

FIG. 3A illustrates a simplified flow chart of a first example of the automatic detection process. As illustrated in FIG. 3A, the sender of the text message determines a test text message (step S300); the sender converts the test text message into a first image (step S302); the sender transmits the test text message and the first image to the final receiver of the text message (step S304); the final receiver converts the received test text message into a second image (step S306); the final receiver compares the first image and the second image to thereby determine whether the receiver supports the first character set encoding scheme (step S308); and the final receiver transmits a determination result to the sender (step S310). If the first image and the second image in comparison are consistent in terms of the font, the size, the color, etc., of the presented test text message, then it can be determined that the receiver supports the first character set encoding scheme. Those of ordinary skill in the art can readily appreciate that various criteria can be preset for implementing the comparison between the first image and the second image to determine whether they are consistent with each other. Those of ordinary skill in the art can also readily appreciate that various comparison methods are possible to implement the solution of the invention, and descriptions thereof will be omitted here. Further, the test text message is a message which may be relevant to the text message to be transmitted, for example, the test text message and the text message to be transmitted are identical with each other in type.

Figure 3B:
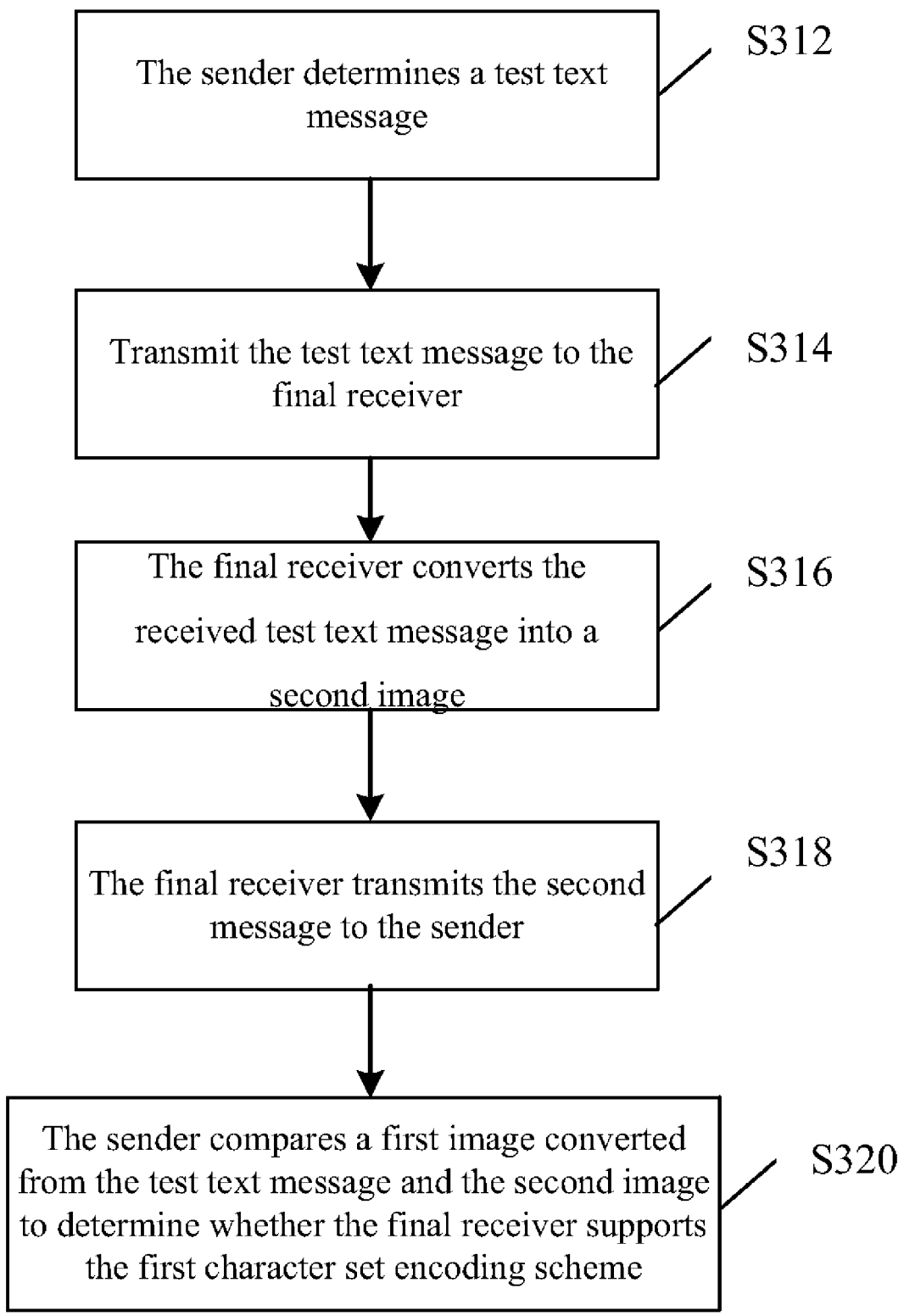

FIG. 3B illustrates a simplified flow chart of a second example of the automatic detection process. As illustrated in FIG. 3B, the sender of the text message determines a test text message (step S312); the sender transmits the test text message to the final receiver of the text message (step S314); the final receiver converts the received test text message into a second image (step S316); the final receiver transmits the second image to the sender of the text message (step S318); and the sender compares a first image and the second image to thereby determine whether the receiver supports the first character set encoding scheme. The first image is obtained through implementation of the text-to-image conversion on the test text message by the sender (step S320). It is apparent that, the image into which the test text message is converted and the image into which the received test text message is converted are compared in both the present example and the example in FIG. 3A, but these two images are compared at the final receiver of the text message to be transmitted in the example in FIG. 3A and at the sender of the text message to be transmitted in the present example.

Figure 3C:
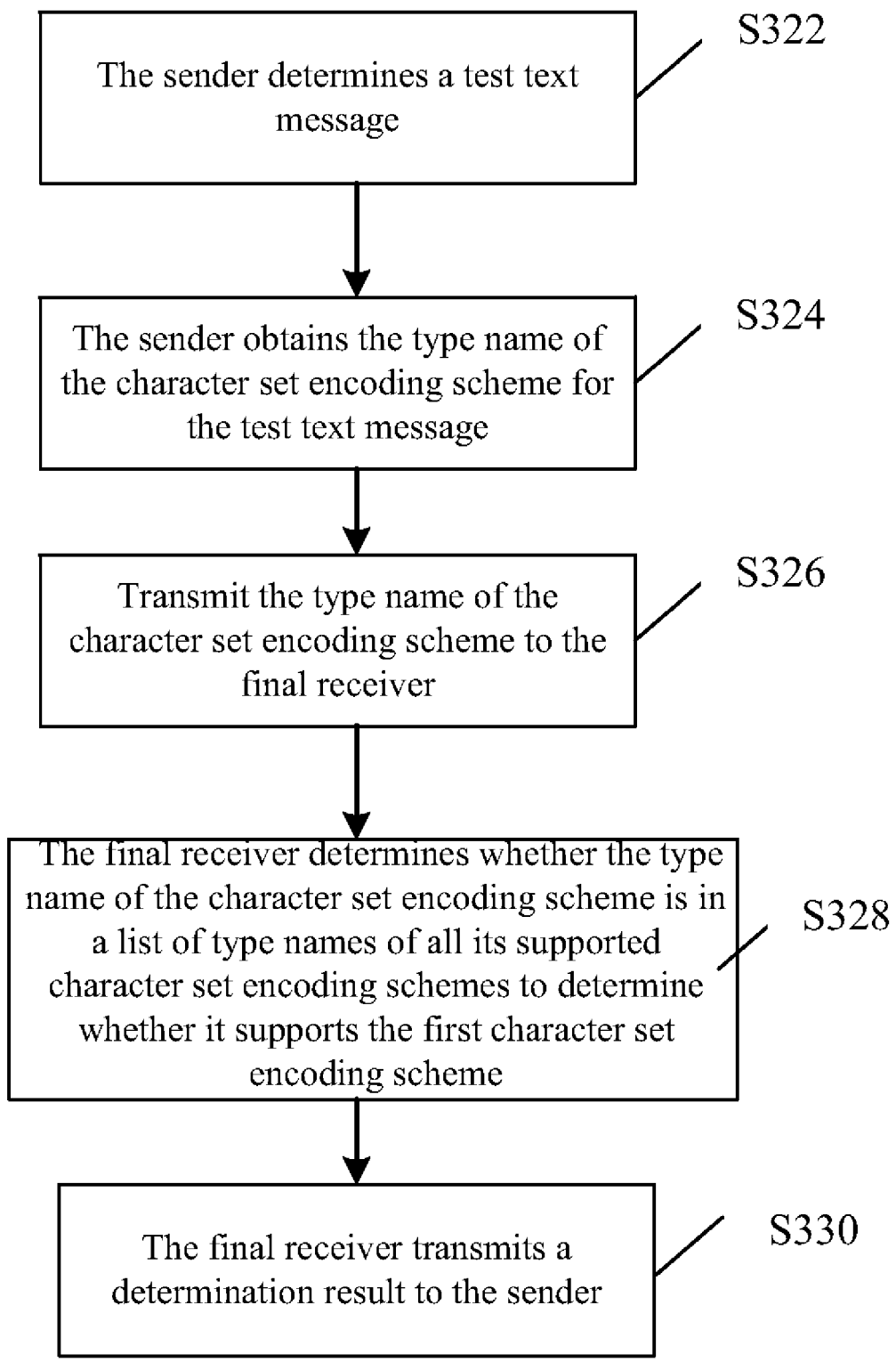

FIG. 3C illustrates a simplified flow chart of a third example of the automatic detection process. As illustrated in FIG. 3C, the sender of the text message determines a test text message (step S322); the sender obtains the type name of the character set encoding scheme for the test text message (step S324); the sender transmits the type name of the character set encoding scheme for the test text message to the final receiver of the text message (step S326); the final receiver determines whether the type name of the character set encoding scheme for the test text message is in a list of type names of all character set encoding schemes supported by the final the receiver to thereby determine whether the final receiver supports the first character set encoding scheme (step S328); and the final receiver transmits the determination result to the sender (step S330).

Figure 3D:
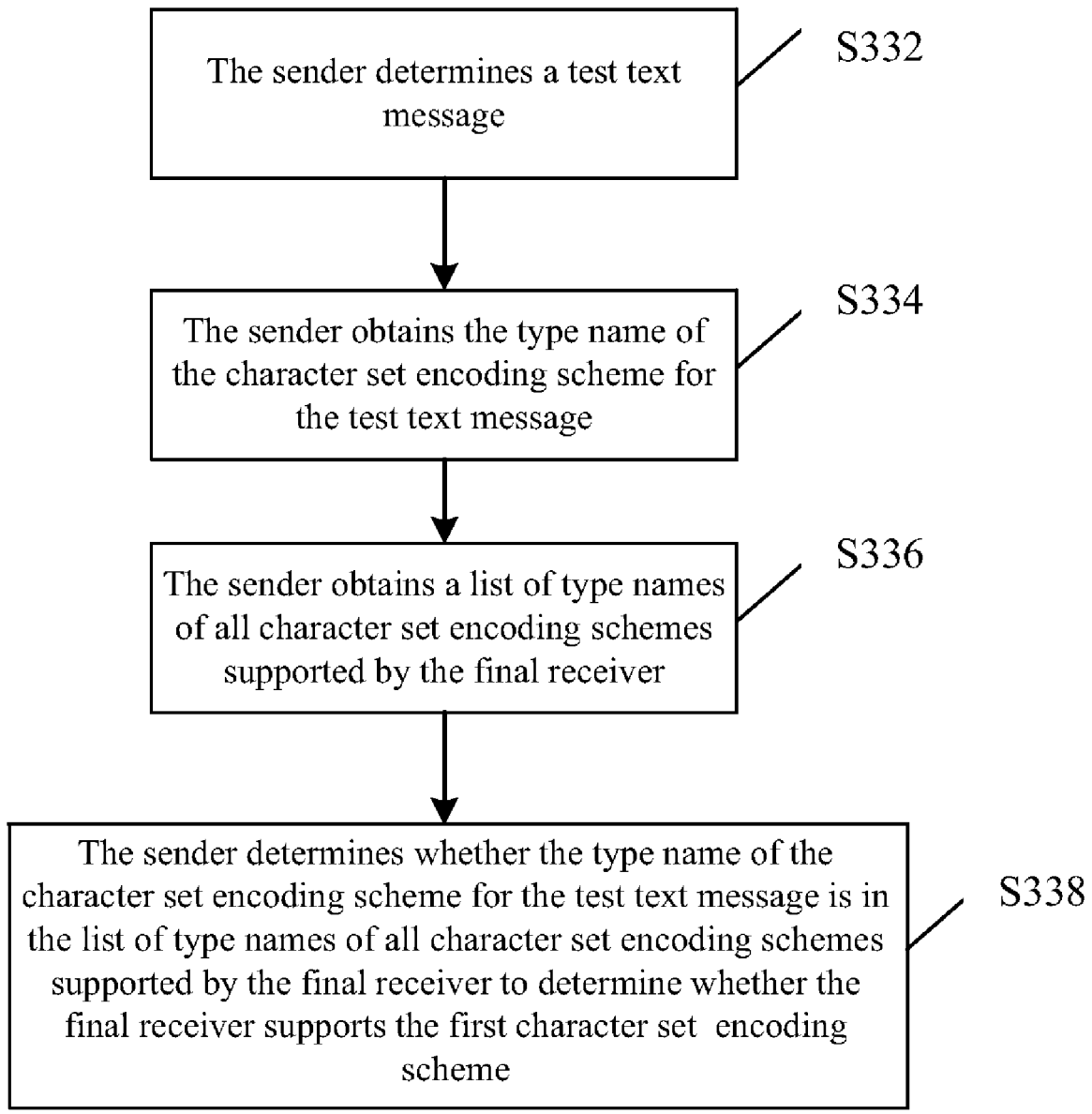

FIG. 3D illustrates a simplified flow chart of a fourth example of the automatic detection process. As illustrated in FIG. 3D, the sender of the text message determines a test text message (step S332); the sender obtains the type name of the character set encoding scheme for the test text message (step S334); the sender obtains a list of type names of all character set encoding schemes supported by the final receiver of the text message (step S336); and the sender determines whether the type name of the character set encoding scheme for the test text message is in the list of type names of all character set encoding schemes supported by the final receiver to thereby determine whether the final receiver supports the first character set encoding scheme (step S338). The present example is different from the example illustrated in FIG. 3C mainly in that the determination of whether the final receiver of the text message to be transmitted supports the first character set encoding scheme is made at the sender of the text message to be transmitted in the present example and at the final receiver in the example illustrated in FIG. 3C.

The automatic detection processes as illustrated in FIG. 3A to FIG. 3D can be performed upon actual transmission of the text message or performed in advance prior to the actual transmission of the text message. In the latter case, if it is detected that the final receiver of the text message does not support the character set encoding scheme for the text message to be transmitted, the sender can start automatically the method for converting the text message into an image for transmission according to the method of the present invention upon the actual transmission of the text message without waiting for a response message obtained from the final receiver to subsequently start the method for transmitting a text message of the present invention, thereby improving the transmission efficiency.

Although the character set encoding schemes respectively supported by the sender and the receiver are used as a criterion for the determination of whether the transmitted text message can be displayed properly at the receiver in the above embodiments, those of ordinary skill in the art appreciate that similar determination can be made on other information related to proper display of the text message, descriptions of which will be omitted here.

The text message is transmitted after being converted into an image when the character set encoding scheme for the text message to be transmitted is not supported by the final receiver in the above embodiments. However, the text message to be transmitted can alternatively be converted into any other form which can be reproduced properly at the final receiver, such as voice, as mentioned previously. And thus, the text message transmitted from the sender can be reproduced properly as long as an audio player is installed at the final receiver without taking into account a compatibility issue of character set encoding schemes between the sender and the receiver. Furthermore, though the above embodiments merely relate to point-to-point transmission of a text message, those of ordinary skill in the art appreciate that the method for transmitting a text message according to the present invention can be equally applicable to a multiparty text message transmission mode, such as point-to-multipoint, multipoint-to-multipoint, etc., and an online conference application is an example of the multiparty text message transmission mode.

Figure 4:
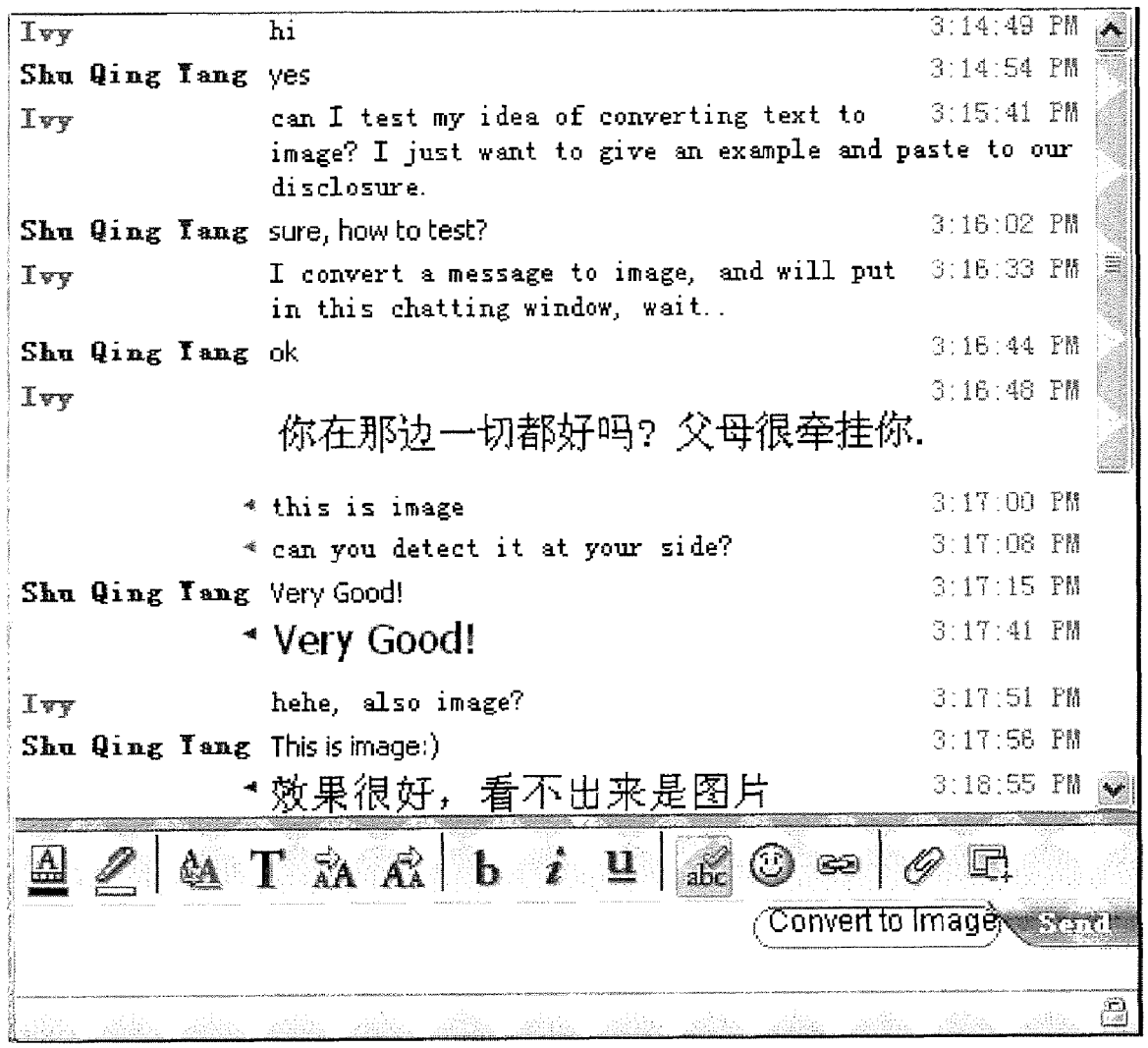
FIG. 4 is a schematic diagram illustrating a screenshot at a sender and a receiver of a text message to be transmitted during an implementation of the method for transmitting a text message according to the invention.

FIG. 4 illustrates a schematic diagram of a screenshot at the sender and the receiver during implementation of the method for transmitting a text message according to the invention. As illustrated in FIG. 4, Chinese text messages of " 你在那边还好吗？ 父母很牵挂你", "效果很好， 看不出来是图片", and an English text message with a larger font of "Very Good!" are information obtained by performing the text-to-image conversion on the corresponding text messages and transmitting the images converted from the text messages. It is apparent from the figure that, the text message to be transmitted can be transmitted precisely between the sender and the receiver through the method for converting the text message into an image according to the invention.

With the method for transmitting a text message according to the invention, the sender can process a text message to be transmitted, for example, by the text-to-image conversion, so that the transmitted text message can be displayed properly at the final receiver of the text message regardless of the situation as to whether relevant prerequisites for proper reproduction of the text message in systems of the sender and receiver, for example, their respective supported character set encoding schemes, are in match, thereby greatly facilitating smooth transmission of the text message. Furthermore, the method for transmitting a text message according to the invention is easy to implement, since the sender and the receiver of the text message only need to be configured simply to be adapted to perform the operations as illustrated in FIG. 1, FIG. 2A and FIG. 2B and FIG. 3A to FIG. 3D without any additional arrangement thereof including, for example, addition of a character set encoding scheme compatible with an opposite party.

Figure 5:
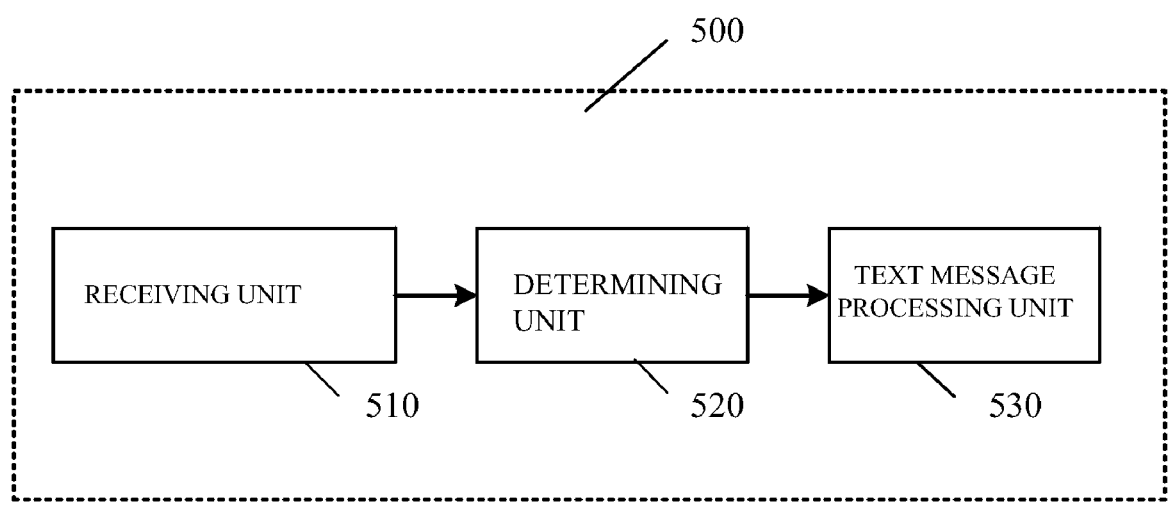
FIG. 5 is a block diagram illustrating an embodiment of a device for transmitting a text message according to the invention.

The invention further proposes a device for transmitting a text message configured to be adapted to implement the method for transmitting a text message illustrated in FIG. 1, FIG. 2A and FIG. 2B and FIG. 3A to FIG. 3D. FIG. 5 is a block diagram illustrating an embodiment of the device for transmitting a text message according to the invention. As illustrated, the device for transmitting a text message 500 according to the invention includes a receiving unit 510 for receiving a text message to be transmitted, a determining unit 520 and a text message processing unit 530, and these units are coupled sequentially. The receiving unit 510 for receiving a text message to be transmitted is configured to receive a text message to be transmitted, in which the text message is encoded in a first character set encoding scheme. The determining unit 520 is configured to determine whether a final receiver of the text message supports the first character set encoding scheme. The text message processing unit 530 is configured to perform the operations of converting the text message to be transmitted into an image and of transmitting the image converted from the text message, in response to a determination result obtained by the determining unit 520 that the final receiver of the text message does not support the first character set encoding scheme.

The receiving unit 510 for receiving a text message to be transmitted can implement the process of the step S110 in the method for transmitting a text message according to the present invention as illustrated in FIG. 1 to thereby receive the text message to be transmitted by selecting input contents in a specific input region. The specific input region can be, for example, a screen region on an interface of the sender of the text message. The screen region is adapted to contain the text message to be transmitted.

In an embodiment of the device for transmitting a text message according to the invention, the text message processing unit 530 can obtain bitmap information of the entire text message to be transmitted in the specific input region by initializing a bitmap information buffer area of the specific input region corresponding to the text message to be transmitted, and put the obtained bitmap information in the bitmap information buffer area to thereby convert the text message to be transmitted into an image in accordance with the bitmap information in the bitmap information buffer area. For example, reference can be made to the implementing modes described in the steps S210 to S260 of the method for transmitting a text message as illustrated in FIG. 2A for specific operations of the text message processing unit 530, and redundant description of the specific operations will be omitted here.

In an embodiment of the device for transmitting a text message according to the invention, when the contents in the specific input region are all visible, all the bitmap information of the text message to be transmitted is stored in a display memory storage space inside the sender because the specific input region corresponds to the display memory. In this case, the text message processing unit 530 can obtain the bitmap information of the text message to be transmitted from the bitmap information stored in the display memory of the sender of the text message and thereby implementing the text-to-image conversion. For example, reference can be made to the implementing modes described in the steps S270 to S280 of the method for transmitting a text message as illustrated in FIG. 2B for specific operations of the text message processing unit 530, and redundant description of the specific operations will be omitted here.

In an embodiment of the device for transmitting a text message according to the invention, the determining unit 520 can be configured to determine whether the final receiver of the text message supports the first character set encoding scheme corresponding to the text message to be transmitted according to a response message returned from the final receiver of the text message to be transmitted or by an automatic detection process executed by the sender of the text message to be transmitted. For example, reference can be made to the embodiments illustrated in FIG. 3A to FIG. 3D for a specific automatic detection process executed by the determining unit 520, and redundant description thereof will be omitted here.

Those of ordinary skill in the art appreciate that the constituent units of the device for transmitting a text message 500 according to the invention can be configured by software, hardware or a combination thereof.

The device for transmitting a text message 500 according to the invention can be incorporated in a general device for processing a text message in the prior art to thereby implement the method for transmitting a text message by converting the text message to be transmitted into an image according to the invention as illustrated in FIG. 1, FIG. 2A and FIG. 2B and FIG. 3A to FIG. 3D.

The invention further proposes a system for transmitting a text message including two or more of the above described devices for transmitting a text message according to the invention, so that the system for transmitting a text message can implement the method for transmitting a text message as illustrated in FIG. 1, FIG. 2A and FIG. 2B and FIG. 3A to FIG. 3D. Additionally, at least one of the devices for processing a text message in the system for transmitting a text message can be a mobile communication terminal, such as a mobile phone, a palm computer PDA, a notebook computer, etc.

The invention further proposes a machine readable program which, when being installed into a machine such as a computer, can cause the computer to implement the above described method for transmitting a text message according to the invention.

A storage medium in which the above machine readable program is carried will also come into the scope of the invention. Such a storage medium includes but will not be limited to a floppy disk, an optical disk, an optical-magnetic disk, a memory card, a memory stick, etc.

The terms "sender" and "receiver" in the descriptions of the above described embodiments respectively refers to a party transmitting a text message and another party receiving the transmitted text message during a specific transmission of the text message. However, those of ordinary skill in the art appreciate that the transmission of a text message relates to interaction of the text message between two or more parties, and thus, any party can be a sender and/or a receiver and hence collectively referred to as "party (parties) involved in transmission of the text message".

Although the invention has been disclosed with the above descriptions of the embodiments of the invention, it shall be appreciated that those of ordinary skill in the art can make various modifications, adaptations or equivalents of the invention without departing from the spirit and scope of the appended claims, and these modifications, adaptations or equivalents shall also be deemed to be within the scope of the invention defined by the appended claims or the equivalents thereof.

The invention claimed is:

1. A method for transmitting a text message, comprising:
   a mobile phone receiving a text message input to be transmitted, which is encoded with a first character set encoding scheme;
   the mobile phone determining that a final receiver mobile phone of the text message input does not support the first character set encoding scheme; and
   in response to said determining that the final receiver mobile phone does not support the first character set encoding scheme, the mobile phone converting the text message to be transmitted into a first image and a second image, wherein said converting the text message to be transmitted into the first image and the second image comprises, initializing a bitmap information buffer of the mobile phone;
   converting a first text message input portion of the text message input that is displayed on a screen of the mobile phone into the first image;
   storing the first image in the bitmap information buffer;
   determining that the text message input includes a second text message input portion of the text message input that cannot be concurrently displayed with the first text message input portion on the screen of the mobile phone;
   converting the second text message input portion into the second image after the first text message input portion is replaced with the second text message input portion on the screen;
   storing the second image in the bitmap information buffer with the first image; and
   the mobile phone transmitting the first image and the second image to the final receiver mobile phone instead of the text message input.

2. The method for transmitting a text message according to claim 1, wherein said determining that the final receiver mobile phone does not support the first character set encoding scheme comprises:
   the mobile phone determining a test text message;
   the mobile phone transmitting the test text message to the final receiver mobile phone, wherein the final receiver mobile phone converts a received test text message into a second test text image;
   the mobile phone receiving the second test text image;
   the mobile phone converting the test text message into a first test text image; and
   the mobile phone comparing the first test text image and the second test text image to determine that the final receiver mobile phone does not support the first character set encoding scheme based on the first test text message and the second test text message not matching.

3. The method for transmitting a text message according to claim 1, wherein said determining that the final receiver mobile phone does not support the first character set encoding scheme comprises:

determining, by the mobile phone, a test text message;

obtaining, by the mobile phone, a type name of the first character set encoding scheme for the test text message;

obtaining, by the mobile phone, a list of type names of all character set encoding schemes supported by the final receiver mobile phone of the text message; and determining, by the mobile phone, that the type name of the first character set encoding scheme for the test text message is not in the list of type names of all character set encoding schemes supported by the final receiver mobile phone.

4. A mobile phone device for transmitting a text message, comprising:

a display;

a receiving unit configured to receive the text message input to be transmitted, which is encoded with a first character set encoding scheme;

a determining unit configured to determine that a final receiver of the text message input does not support the first character set encoding scheme; and a text message processing unit configured to convert the text message input into a first image and a second image in response to a determination result obtained by the determining unit, the determination result indicating that the final receiver of the text message does not support the first character set encoding scheme, wherein the text message processing unit being configured to convert the text message input into the first image and the second image comprises the text message processing unit configured to, initialize a bitmap information buffer of the mobile phone device;

convert a first text message input portion of the text message input that is displayed on the display of the mobile phone into the first image;

store the first image in the bitmap information buffer;

determine that the text message input includes a second text message input portion of the text message input that cannot be concurrently displayed with the first text message input portion on the display of the mobile phone;

convert the second text message input portion into the second image after the second message input portion replaces the first text message portion on the display;

store the second image in the bitmap information buffer with the first image; and the test message processing unit also configured to transmit the first image and the second image instead of the text message input.

5. The mobile phone device of claim 4, wherein the determining unit configured to determine that the final receiver of the text message input does not support the first character set encoding scheme comprises the determining unit being configured to:

determine a test text message;

transmit the test text message to the final receiver;

receive a first test text image from the final receiver;

convert the test text message into a second test text image; and compare the first test text image and the second test text image to determine that the final receiver of the text message does not support the first character set encoding scheme based on the first test text image not matching the second test text image.

6. The mobile phone device of claim 4, wherein the determining unit being configured to determine that the final receiver of the text message does not support the first character set encoding scheme comprises the mobile phone device being configured to:

determine a test text message;

obtain a type name of the first character set encoding scheme for the test text message;

obtain a list of type names of all character set encoding schemes supported by the final receiver of the text message; and determine that the type name of the first character set encoding scheme for the test text message is in the list of type names of all character set encoding schemes supported by the final receiver of the text message to determine that the final receiver of the text message does not support the first character set encoding scheme.

* * * * *